(12) United States Patent
Juergensmeyer et al.

(10) Patent No.: US 7,540,365 B2
(45) Date of Patent: Jun. 2, 2009

(54) ELECTROMAGNETICALLY OPERATED FRICTION DISK CLUTCH AND ROTOR FOR A CLUTCH OF THIS TYPE

(75) Inventors: Jan Juergensmeyer, Markdorf (DE); Rainer Krafft, Heiligenberg (DE)

(73) Assignee: Linnig Trucktec GmbH, Markdorf (DE)

( * ) Notice: Subject to any disclaimer, the term of this patent is extended or adjusted under 35 U.S.C. 154(b) by 356 days.

(21) Appl. No.: 11/494,792

(22) Filed: Jul. 27, 2006

(65) Prior Publication Data

US 2007/0023251 A1 Feb. 1, 2007

(30) Foreign Application Priority Data

Jul. 29, 2005 (DE) .................. 10 2005 036 418

(51) Int. Cl.
*F16D 27/10* (2006.01)

(52) U.S. Cl. .................. 192/84.2; 192/84.93; 310/103

(58) Field of Classification Search .................. 192/84.9, 192/84.93, 84.96, 84.2; 310/103
See application file for complete search history.

(56) References Cited

U.S. PATENT DOCUMENTS

| | | | | |
|---|---|---|---|---|
| 2,848,085 A | * | 8/1958 | Mannaioni | .................. 192/84.2 |
| 3,712,439 A | | 1/1973 | Schacher et al. | |
| 3,857,468 A | * | 12/1974 | Iritono et al. | ............. 192/84.51 |
| 4,488,627 A | | 12/1984 | Streich et al. | |
| 4,498,066 A | | 2/1985 | Fujiwara et al. | |
| 4,564,092 A | * | 1/1986 | Pierce | ..................... 192/48.2 |
| 4,567,975 A | | 2/1986 | Roll | |
| 4,749,073 A | * | 6/1988 | Olsen | ..................... 192/52.5 |
| 5,121,018 A | * | 6/1992 | Oldakowski | .................. 310/77 |
| 6,468,163 B1 | * | 10/2002 | Boffelli et al. | ................. 464/29 |
| 7,143,885 B2 | * | 12/2006 | Krafft | ..................... 192/84.94 |

FOREIGN PATENT DOCUMENTS

| | | |
|---|---|---|
| DE | 26 38 944 A1 | 3/1978 |
| DE | 30 33 140 | 4/1982 |
| DE | 30 33 140 C2 | 6/1985 |
| DE | 199 51 630 A1 | 6/2001 |
| DE | 10 2004 042 687 A1 | 3/2006 |
| EP | 0 249 490 A2 | 12/1987 |
| EP | 1 353 051 | 10/2003 |
| GB | 1 586 180 A1 | 3/1981 |
| JP | 55-119229 A1 | 9/1980 |

* cited by examiner

*Primary Examiner*—Burton Mullins
(74) *Attorney, Agent, or Firm*—Burr & Brown

(57) ABSTRACT

The invention proposes a rotor for a two-stage electromagnetically operated friction disk clutch which comprises two electromagnets and armature means which can be brought into contact with the rotor and are composed of a magnetically permeable material. According to the invention, there is no axial web, or at least no substantial axial web, which projects into the electromagnetic region in a manner arranged in the friction clutch on the rotor, between a radially outer edge region and a radially inner center region on the rotor. The invention also proposes an electromagnetically operated friction disk clutch which has a rotor of this type.

9 Claims, 2 Drawing Sheets

US 7,540,365 B2

ELECTROMAGNETICALLY OPERATED FRICTION DISK CLUTCH AND ROTOR FOR A CLUTCH OF THIS TYPE

This application claims the benefit under 35 USC 119(a)-(d) of German Application No. 10 2005 036 418.7, filed Jul. 29, 2005, the entirety of which is incorporated herein by reference.

FIELD OF THE INVENTION

The invention relates to a rotor for an electromagnetically operated friction disk clutch, and to an electromagnetically operated friction disk clutch.

BACKGROUND OF THE INVENTION

Friction disk clutches or rotors for friction disk clutches of the type mentioned in the introduction are already known in a very wide variety of forms.

The rotors have webs which project regularly and axially and, as viewed in the radial direction, overlap magnet-surrounding means for electromagnets of the friction disk clutch. As a result, the desired field profile is achieved at an air gap between the magnet-surrounding means and rotor webs.

Rotors of electromagnetic clutches are frequently produced on steel blanks. In this case, a so-called preturning contour is first produced from the steel blank. Track-like depressions in which magnetically insulating materials, for example copper, are melted can be provided here. In a final machining process of the rotor, said rotor is cut to its final dimensions.

This procedure is comparatively time-consuming and cost-intensive since a great deal of tool work is required and relatively large amounts of material need to be machined in order to form the webs.

Furthermore, rotors are known which are produced by deep-drawing from a sheet metal part and forming magnetic blocking zones therein by means of air gaps. In any case, the production of such rotors is comparatively complex on account of the tools required.

SUMMARY OF THE INVENTION

The invention is based on the object of providing a rotor for an electromagnetically operated two-stage friction disk clutch, and a friction disk clutch of this type, it being possible to produce the rotor in a simpler and more cost-effective manner, and the friction disk clutch having a functionality which is comparable to known arrangements.

The invention is firstly based on a rotor for a two-stage electromagnetically operated friction disk clutch which comprises two electromagnets and armature means which can be brought into contact with the rotor and are composed of a magnetically permeable material. The core of the invention is that no axial web, or at least no substantial axial web, which projects into the electromagnetic region in a manner arranged in the friction disk clutch, preferably between the electromagnets, is arranged on the rotor between a radially outer edge region and a radially inner center region. To date, rotors for two-stage clutches have always had a web at this point, which web extends between the magnets such that it overlaps the magnets and magnet-surrounding means, as viewed in the radial direction. The intention of this is to prevent a field profile with excessively high axial forces being produced. Since the lines of force are oriented largely radially and not axially at the transition between the magnet-surrounding means and the rotor web on account of the overlapping arrangement, the inventors have now found that an axial field profile at the transition of the magnet-surrounding means and the rotor can be tolerated at least between a hub region and a radial edge region. The advantage of this is that the web which extends between the magnets is reduced, and ideally can be entirely dispensed with. As a result, machining costs can be lowered and the size of the electromagnets of the friction disk clutch can be correspondingly increased at the same time on account of the increase in space, as a result of which performance of the clutch can be improved with the same physical size. In order to prevent the axial lines of force components in the air gap between the rotor and the magnet-surrounding means from becoming too large, an axial overlap with the magnet-surrounding means is in each case created by a shaft stub in the hub region and a web on the rotor in the radial outer region, for example.

In the simplest embodiment, the rotor is designed as a disk without substantial axial web sections projecting out of the plane of the rotor. This greatly simplifies production of the rotor. In particular, the amount of material which was previously wasted can be considerably reduced.

The rotor is preferably produced from magnetically permeable yet wear-resistant and hardenable material since the rotor must be able to withstand the frictional stress on the armature means when the clutch is shifted.

If an, in particular, annular web is provided on the rotor, for example in the radially outer edge region, said web is preferably not integrally formed with the rotor, but attached to the rotor. Therefore, a different material can also be used for the web, for example a more highly magnetically permeable material. In addition, production of the base plate of the rotor is not made more complex as a result.

A radially circumferential web may, for example, be used directly as a belt pulley for driving the rotor. A hub or shaft stub can be attached in the center region, just like for the outer web. However, in a simplified embodiment, a hub sleeve is fitted only to the rotor, that is to say frictionally connected to the rotor.

The described motor is preferably used in an electromagnetically operated two-stage friction disk clutch having two annular electromagnets which are arranged in succession in the radial direction, magnet-surrounding means which partially surround the electromagnets, and also armature means which can be brought into contact with the rotor and are composed of a preferably magnetically permeable material.

Furthermore, particular preference is given to the magnet-surrounding means being in the form of a, preferably individual, annular web between the electromagnets, which web runs in an axial manner and has at least no substantial axial overlap with a rotor section which projects out of the plane of the rotor. As already explained above, this refinement of the magnet-surrounding means allows the size of electromagnets to be increased on account of the increase in space due to the omission of an overlap region and thus of a web of the rotor. In addition, the magnetic field in the magnet-surrounding means, which are composed of a highly magnetically conductive material, can be conducted as far as the rotor with less loss.

Nevertheless, in order to create an overlap region with an overlap area which runs axially between the rotor and the magnet-surrounding means, the rotor may have a slot into which the web, which runs in the axial direction, between the electromagnets extends. As a result, an axial force, which is produced by the magnetic field, can be reduced at least partially in comparison to an air-gap location, which is obtuse as viewed in the axial direction, to the rotor.

A further important aspect of the invention is that the magnet-surrounding means on the radially outer edge extend axially in the direction of the rotor in such a way that the magnet-surrounding means cover the rotor, as viewed in the radial direction, that is to say axially, without touching said rotor.

This procedure means that a radially outer web on the rotor can be avoided, provided this is not required for other design reasons, but a largely radial lines of force profile in the air gap to the rotor can nevertheless be achieved. The rotor can therefore be produced directly from a flat material in the form of a disk without axial webs.

BRIEF DESCRIPTION OF THE DRAWINGS

Two exemplary embodiments of the invention are illustrated in the drawings and will be explained in greater detail below, while providing information about further advantages and details.

DETAILED DESCRIPTION OF THE INVENTION

Figure 1:
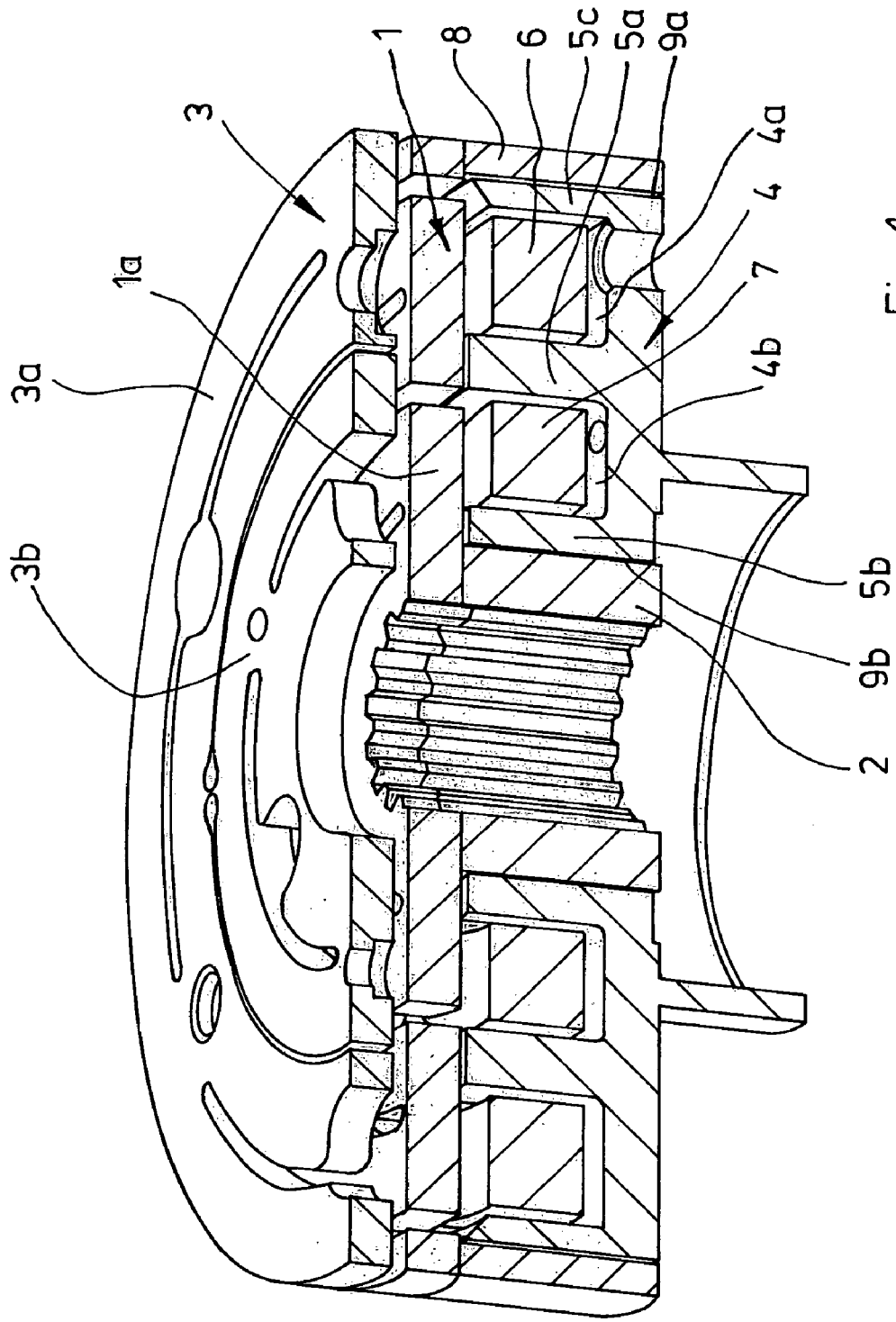
FIG. 1 shows a perspective sectional view through a first friction disk clutch with the important elements.

FIG. 1 depicts the important parts of a friction disk clutch. These include a rotor 1 which has an armature disk 3 spatially opposite it. The rotor has a shaft section 2 which is preferably only frictionally connected to a rotor disk 1a. At the radially outer edge, the rotor also comprises an annular web 8 which runs in the axial direction. The web 8 is preferably not integrally formed with the rotor disk 1a but attached to the rotor disk 1a, for example by welding, in particular laser welding. A magnet-surrounding body 4 is provided between the shaft section 2 and the web 8 and has two annular slot regions 4a, 4b which contain solenoids 6, 7.

In order to produce a two-stage friction disk clutch, the armature disk 3 is divided into two annular sections 3a, 3b which are drawn toward the rotor disk 1a when correspondingly supplied with power. If the solenoid 6 is switched on, the armature disk section 3a is drawn toward the rotor disk 1a. If the solenoid is switched on, the armature disk section 3b is drawn toward the rotor disk 1a. In the process, the armature disk sections 3a, 3b are respectively frictionally connected to the rotor disk 1a.

In order for the friction disk clutch to operate effectively, it is necessary for the magnetic field to be applied to the desired track in as loss-free a manner as possible.

Whereas the rotor disk 1a, just like the armature disk 3, is composed of a magnetically permeable, wear-resistant and hardenable material, the shaft stub 2 and the web are preferably composed of an extremely highly magnetically permeable material. The magnet-surrounding body 4, which has webs 5a, 5b, 5c which each extend as far as the rotor disk 1a but do not touch said rotor disk, is likewise composed of an extremely highly magnetically permeable material, so that it is possible for the rotor 1 and the magnet-surrounding body 4 to move relative to one another.

In order to avoid axially oriented arrangements of lines of force at an air-gap transition 9a, 9b, the rotor 1 axially overlaps the magnet-surrounding body 4 at these points, that is to say an overlap area is produced, as viewed in the radial direction. The axial webs 5b, 5c serve this purpose on the magnet-surrounding body and the shaft section 2 and the attached web 8 serve this purpose on the rotor 1.

Only one web 5a of the magnet-surrounding body 4 adjoins the rotor disk 1a in an abutting fashion, as viewed in the axial direction. Although axial forces are transmitted from the solenoids to the rotor 1 as a result, it has been found that these axial forces can be tolerated.

The design of the rotor 1 is considerably simpler on account of an axial web on the rotor 1, which web extends between the solenoids 6, 7, being avoided. There is also an increase in space which can be used for larger solenoids 6, 7, and this increases the performance of the friction disk clutch. The rotor disk can be produced comparatively simply from flat material by the web 8, which is preferably composed of a material other than that of the rotor disk 1a, being attached. The amount of material wasted can be reduced to a minimum in this way.

Figure 2:
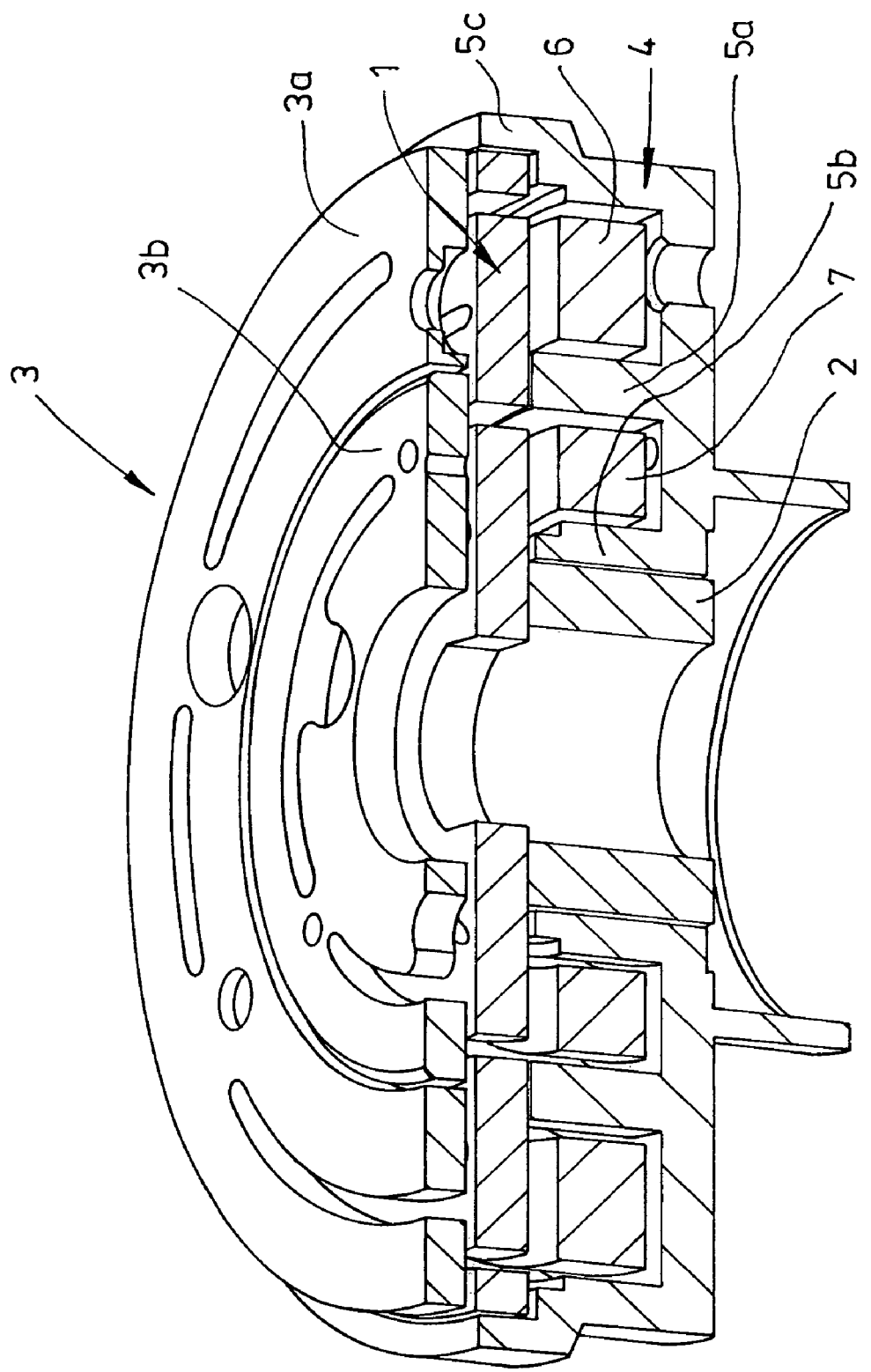
FIG. 2 shows an illustration of a second embodiment of a friction disk clutch which corresponds to FIG. 1.

FIG. 2 depicts a further variant of a friction disk clutch in an illustration which corresponds to FIG. 1. Corresponding parts of the friction disk clutch are provided with the same reference symbols as in FIG. 1.

The difference between the embodiments is that there is no web 8 of the rotor 1 in the friction disk clutch in FIG. 2. This cuts down on one structure of the rotor on the rotor disk 1a. However, in order to ensure as radial a transfer of lines of force as possible from the magnet-surrounding body 4 to the rotor disk 1a, the web 5c of the magnet-surrounding body is extended upwards to such an extent that the radial end face of the rotor disk 1a is covered by the web 5c. The web 5c is shaped in such a way here that an air gap is produced between the rotor disk 1a and the web 5c in order to ensure that the rotor disk 1a and the magnet-surrounding body 4 can move relative to one another without touching.

What is claimed:

1. A rotor for a two-stage electromagnetically operated friction disk clutch which comprises two electromagnets and armature means which can be brought into contact with the rotor and are composed of a magnetically permeable material, wherein in a region encompassing the two electromagnets between a radially outer edge and a radially inner center region on the rotor there is no substantial axial web projecting into the electromagnetic region in the friction clutch, and wherein the rotor comprises a flat disk, and the armature means, the rotor and a magnet surrounding means are arranged in that order with no intervening parts.

2. The rotor as claimed in claim 1, wherein the rotor is a flat disk without substantial axially projecting web sections.

3. The rotor as claimed in claim 1, wherein the rotor is composed of magnetically permeable yet wear-resistant and hardenable material.

4. The rotor as claimed in claim 1, the rotor further comprising a shaft stub which is frictionally connected.

5. The rotor as claimed in claim 1, wherein a radially outer web is attached to the rotor.

6. An electromagnetically operated two-stage, friction disk clutch having at least one electromagnet, a magnet-surrounding means which partially surround the at least one electromagnet, a rotor which can be driven, and armature means which can be brought into contact with the rotor, wherein the rotor is formed according to claim 1.

7. The friction clutch as claimed in claim 6, wherein the magnet-surrounding means are in the form of an axially protruding web between the electromagnets, which web runs in an annular manner and the rotor substantially axially overlaps the magnet surrounding means at an air gap transition between the magnet surrounding means and a shaft section and between the magnet surrounding means and an annular web.

8. The friction clutch as claimed in claim 6, wherein the magnet-surrounding means on the radially outer edge extends axially in the direction of the rotor in such a way that the magnet-surrounding means covers the rotor, as viewed in the radial direction, without touching said rotor.

9. The electromagnetically operated two-stage friction disk clutch of claim 6, wherein the electromagnet comprises two annular electromagnets which are arranged in succession in the radial direction.

* * * * *